(12) United States Patent
Wu

(10) Patent No.: US 12,696,876 B2
(45) Date of Patent: Aug. 4, 2026

(54) PET APPLIANCE

(71) Applicant: US EIWO INC, Ontario, CA (US)

(72) Inventor: Yong Wu, Ontario, CA (US)

(73) Assignee: US EIWO INC, Ontario, CA (US)

( * ) Notice: Subject to any disclaimer, the term of this patent is extended or adjusted under 35 U.S.C. 154(b) by 0 days.

(21) Appl. No.: 19/050,882

(22) Filed: Feb. 11, 2025

(65) Prior Publication Data

US 2025/0176500 A1 Jun. 5, 2025

(30) Foreign Application Priority Data

Jan. 10, 2025 (CN) .......................... 202520058944.8

(51) Int. Cl.
*A01K 15/02* (2006.01)
*A01K 1/03* (2006.01)
*A01K 1/01* (2006.01)

(52) U.S. Cl.
CPC ............ *A01K 15/024* (2013.01); *A01K 1/033* (2013.01); *A01K 1/0107* (2013.01)

(58) Field of Classification Search
CPC ..... A01K 15/024; A01K 1/033; A01K 1/0107
See application file for complete search history.

(56) References Cited

U.S. PATENT DOCUMENTS

| | | | | |
|---|---|---|---|---|
| 11,369,080 | B2 * | 6/2022 | Lu | A01K 1/035 |
| 2009/0223461 | A1 * | 9/2009 | Trunnell | A01K 1/0245 |
| | | | | 119/475 |
| 2017/0172108 | A1 * | 6/2017 | Long, Jr. | A01K 15/024 |
| 2017/0339916 | A1 * | 11/2017 | Deraps | A01K 15/027 |
| 2020/0022331 | A1 | 1/2020 | Ahn | |
| 2021/0153450 | A1 | 5/2021 | Paxson et al. | |
| 2023/0270074 | A1 | 8/2023 | Weber et al. | |
| 2023/0413778 | A1 * | 12/2023 | Ginsburg | A01K 1/033 |

FOREIGN PATENT DOCUMENTS

| | | | | |
|---|---|---|---|---|
| EP | 1576875 A1 * | 9/2005 | | B61H 13/24 |
| KR | 102573740 B1 * | 9/2023 | | A01K 1/035 |

* cited by examiner

*Primary Examiner* — Joshua D Huson
*Assistant Examiner* — Alanna K Peterson

(57) ABSTRACT
The invention discloses a pet appliance which includes a container, an entrance and exit and a claw grinding member, the container includes a placement area, the entrance and exit is configured to enter and exit the placement area, the claw grinding member is detachably connected with the container, and at least part of a claw grinding portion of the claw grinding member is exposed from an outer wall of the container. The invention has a simple structure, and the whole container is egg-shaped and a surrounding structure, which can prevent odor from escaping. In combination with a cat scratch board, the pet appliance can realize multiple functions, and the claw grinding portion can smooth out tips of pet claws.

13 Claims, 7 Drawing Sheets

PET APPLIANCE

TECHNICAL FIELD

The invention belongs to the technical field of pet supplies, and specifically relates to a pet appliance.

BACKGROUND

Pet appliances include cat litter boxes, cat scratch boards, pet feeding bowls, etc. For example, the cat litter boxes are used to hold cat litter for kittens and other pets to hold excrement. Most of the existing pet appliances on the market are open, and the smell of excrement is easy to emanate. For example, pet nests are used for cats and dogs to sleep and rest. For example, as cats and dogs grow, the length of their paws will continue to increase, and the longer the paws, the greater the damage to indoor furniture. Therefore, it is necessary to regularly trim pet claws. At present, claw trimming is mainly done manually by nail clippers. Because the size of the claws is small and slender, the claws trimmed manually by nail clippers are still very sharp. Furthermore, pets such as cats and dogs cannot cooperate during trimming, making it difficult to flatten their claws. Therefore, it is very important to obtain a pet appliance that combines a pet nest or a cat litter box or the like with a claw grinding device.

SUMMARY

In order to solve at least one of the above technical problems, the invention provides a pet appliance which includes: a container, where the container includes at least one placement area, and the placement area may be an area for rest or an area for placing cat litter; or the placement area provides other functions, such as placing toys, placing food, etc.; at least one entrance, where the entrance is configured to enter and exit the placement area; and at least one claw grinding member provided on the container, where at least part of a claw grinding portion of the claw grinding member is exposed on an outer wall of the container. The claw grinding portion may also be exposed from the outer wall and an inner wall at the same time.

Here, the container is provided with at least one inward recess for receiving the claw grinding member, and at least part of a side wall of the claw grinding member is in contact and mates with an inner wall of the inward recess for limiting. In this way, the shape of the claw grinding member is adapted to the shape of the inward recess.

Here, at least one slot is provided on an inner wall of the inward recess, a limiting wall is formed between an inner wall of the slot and at least one side wall of the container, an insert mating with the slot is formed on an outer wall of the claw grinding member, and the insert is at least partially inserted into the slot for limiting. A plurality of slots are communicated with each other to form an annular groove, and a plurality of limiting walls form a limiting ring. The at least one side wall is an inner wall or the outer wall. In this way, the claw grinding member is slightly larger than the inward recess, and the insert formed by an edge of the claw grinding member is arranged at the limiting ring.

The container includes at least one outer member and at least one inner member, the inner member and the outer member are detachably connected, the outer member is provided with a perforation, an outer wall of the inner member at least partially forms a bottom inner wall of the inward recess, a spacing is present between the bottom inner wall and an inner wall of the outer member, the inner wall of the outer member on a peripheral side of the perforation forms a limiting ring, at least part of an edge of the claw grinding member is limited by the limiting ring, and part of the claw grinding member is exposed from the perforation.

The inner member and the outer member are respectively provided with at least one first mounting insert and at least one first mounting slot which mate with each other. The inner member and the outer member are respectively provided with at least one third mounting insert and at least one third mounting slot which mate with each other, and the first mounting insert and the third mounting insert are respectively arranged on upper and lower sides of the inner member. An inner wall of the third mounting insert is provided with a snap-in block, and an inner wall of the third mounting slot is provided with a snap-in groove mating with the snap-in block. The container further includes a base, and the inner member and the base are respectively provided with a second mounting insert and a second mounting slot which mate with each other. The first mounting insert and the second mounting insert are located on a same plane; and a lower edge of an outer wall of the outer member mates with an upper edge of an outer wall of the base for support. A cross section of the container is at least partially polygonal or curved.

Here, the first mounting insert is inserted into the first mounting slot, the third mounting insert is inserted into the third mounting slot, the second mounting insert is inserted into the second mounting slot, and a connection between the inner member and the outer member and a connection between the inner member and the base are arc-shaped or polygonal to improve stability of each mounting insert after insertion and mounting in each mounting slot. The first mounting insert is inserted into the first mounting slot.

In the present embodiment, the inner member and the outer member are snap-connected with or plugged into each other, and in other embodiments, the inner member and the outer member may also be connected by screws.

At least one first limiting rib is provided on the outer wall of the inner member, a side wall of the first limiting rib forms a side wall of the inward recess, and a second limiting rib is provided on the inner wall of the outer member.

A plane on which the first limiting rib is located is parallel to and non-coplanar with a plane on which a symmetry axis of the inner member is located, and/or a plane on which the first limiting rib is located is arranged obliquely with respect to a plane on which a generatrix of the inner member is located.

There are two first limiting ribs which are arranged opposite to each other.

Both side end portions of the inner member are bent and buckled toward the outer member to form a first connecting portion, and at least one stiffening rib is provided between the first limiting rib and the first connecting portion; and an end portion of a bottom side of the inner member is bent or buckled toward the outer member to form a second connecting portion. The arrangement of the first connecting portion and the second connecting portion enables a circular arc connection and provides a spacing between the inner member and the outer member to facilitate mounting of the claw grinding member. The inner wall of the outer member is provided with a third limiting rib for mating with the first connecting portion.

As a preferred embodiment of the above technical solution, the container is provided at a top portion thereof with at least one mounting hole downward, and further includes a recessed structure, and the recessed structure is arranged at the mounting hole.

With the technical solution described above, the mounting hole is step-shaped, the recessed structure includes a recessed outer cylinder and a recessed inner cylinder connected with the recessed outer cylinder, a placement ring is provided on the recessed structure, and both the placement ring and a bottom portion of the recessed outer cylinder are provided with a step mating with the step-shape.

The bottom portion of the recessed outer cylinder and a top portion of the placement ring of the recessed outer cylinder are provided with a plurality of vent holes, and an anti-odor member can be placed between the recessed inner cylinder and the recessed outer cylinder, the anti-odor member is generally activated carbon which adsorbs odor, and a placement position may also be formed at the recessed inner cylinder.

The claw grinding member may be corrugated paper or the like.

Here, the container in the pet appliance of the invention can be used as a cat nest, a dog kennel, or a cat litter box.

Compared with the prior art, the invention has the following advantages: the invention has a simple structure, and the whole container is egg-shaped and a surrounding structure, which can prevent odor from escaping; the invention combines a cat scratch board to realize multiple functions of the pet appliance; and the claw grinding portion can smooth out tips of claws of pets such as cats and dogs, and can effectively prevent cat claws or dog claws from causing damage to indoor furniture. Moreover, a frosted surface of the claw grinding portion can be used for pets to grind the claw independently, thereby avoiding the problem that the pets do not cooperate with the claw grinding and reducing the difficulty of claw trimming.

Figure 1:
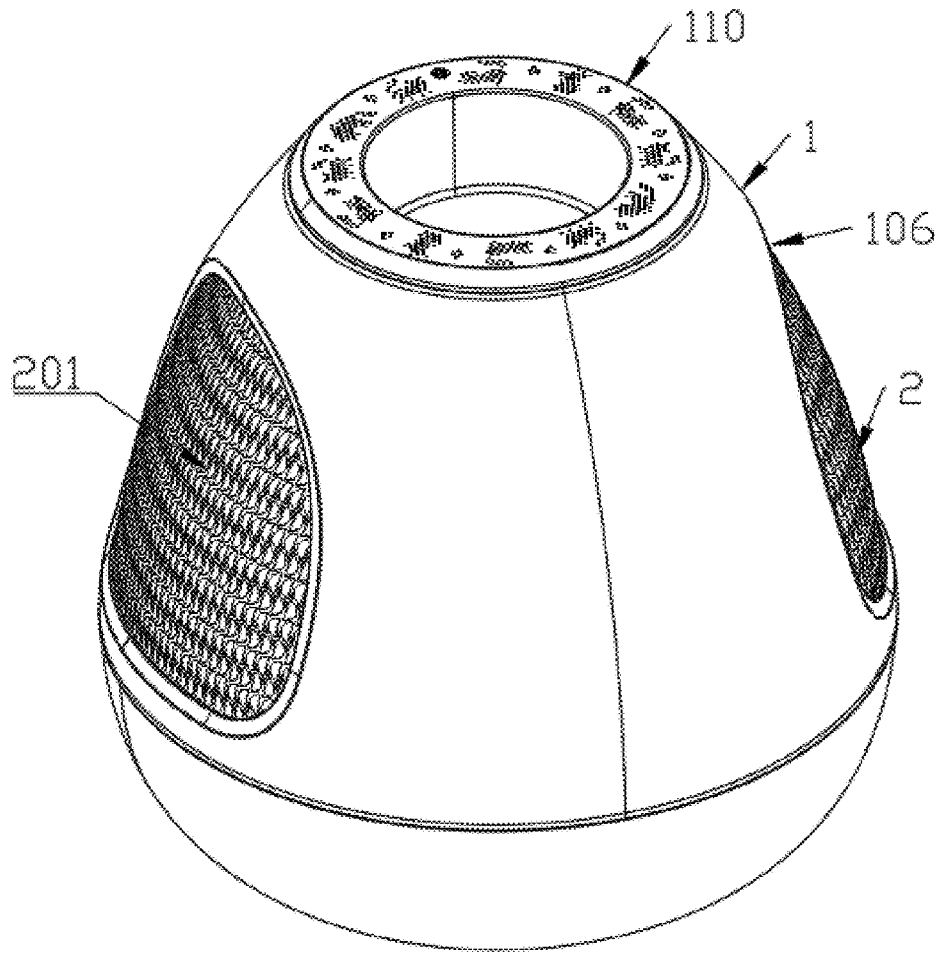
FIG. 1 is a stereoscopic view of the invention.
Figure 2:
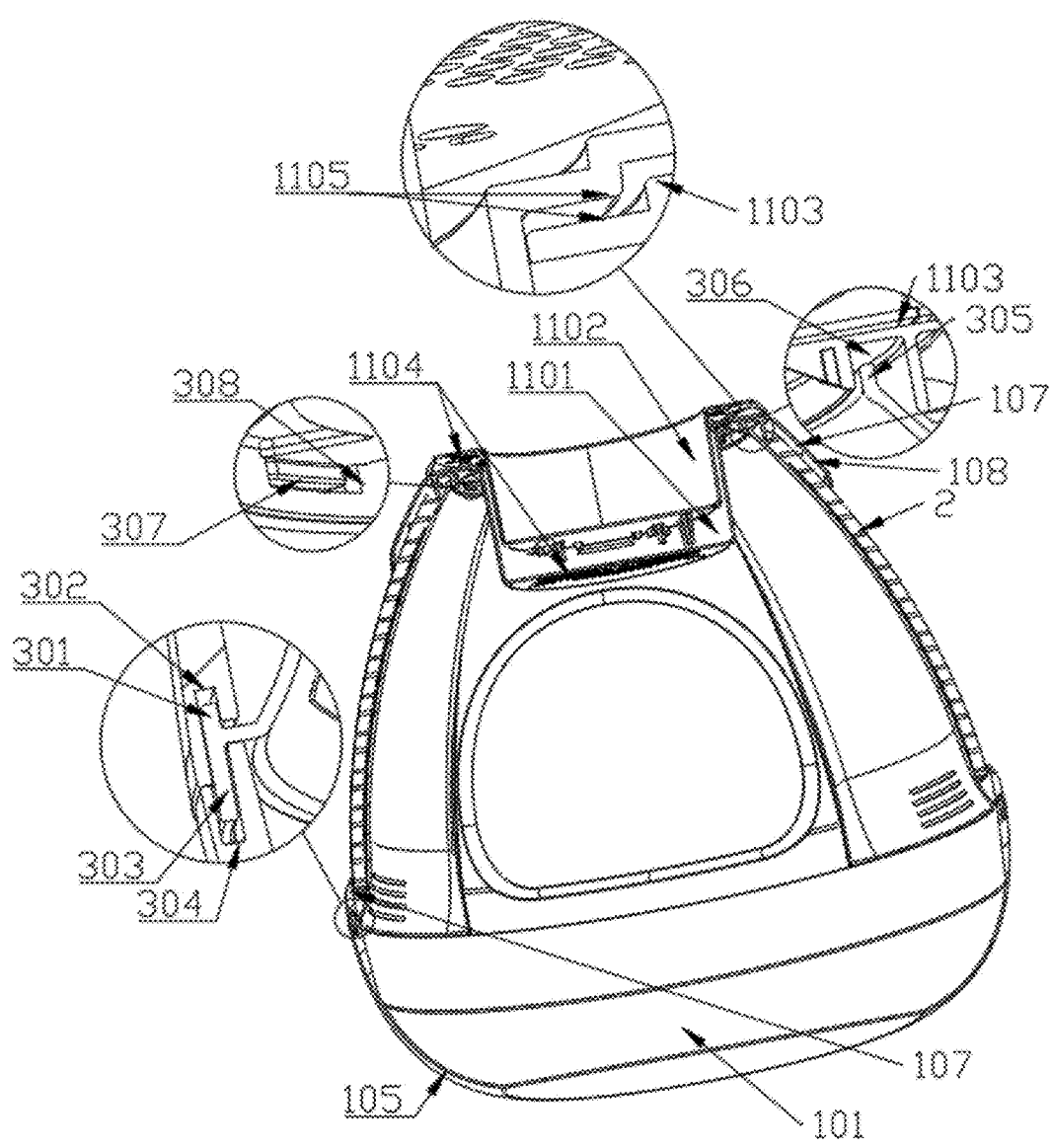
FIG. 2 is a cross-sectional stereoscopic view of the invention.
Figure 3:
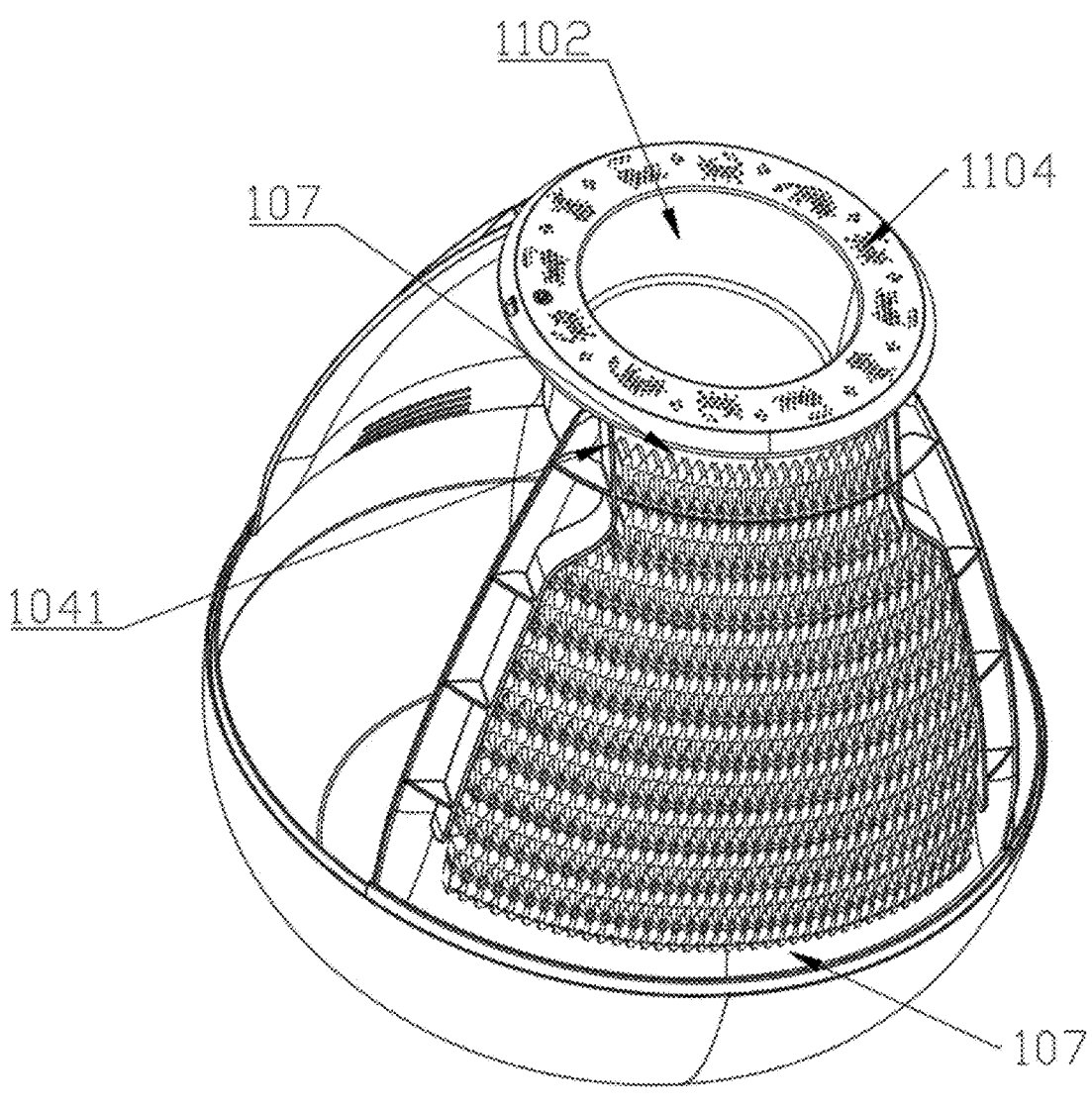
FIG. 3 is a stereoscopic view of a hidden outer member of the invention.
Figure 4:
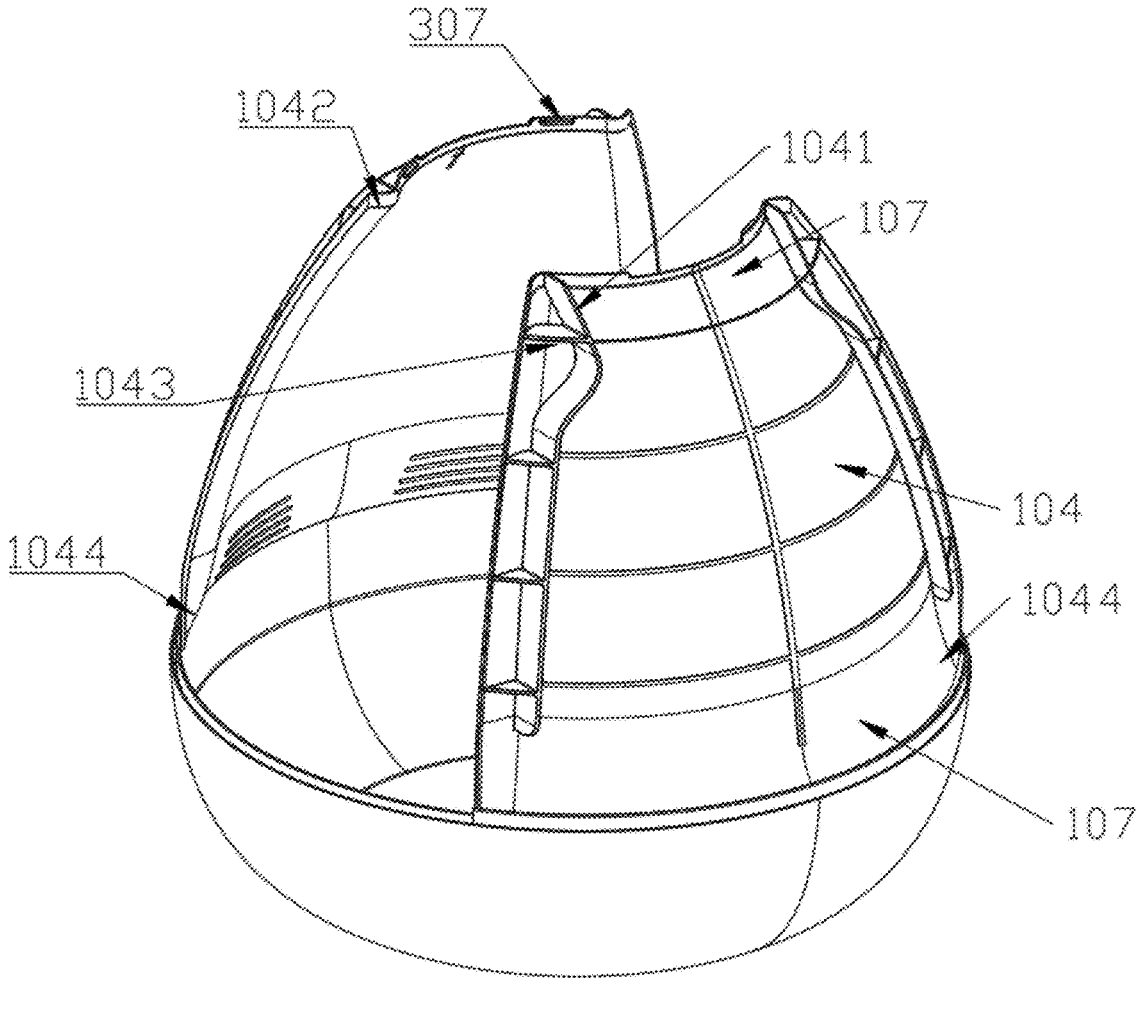
FIG. 4 is a stereoscopic view of a hidden outer member and claw grinding member of the invention.
Figure 5:
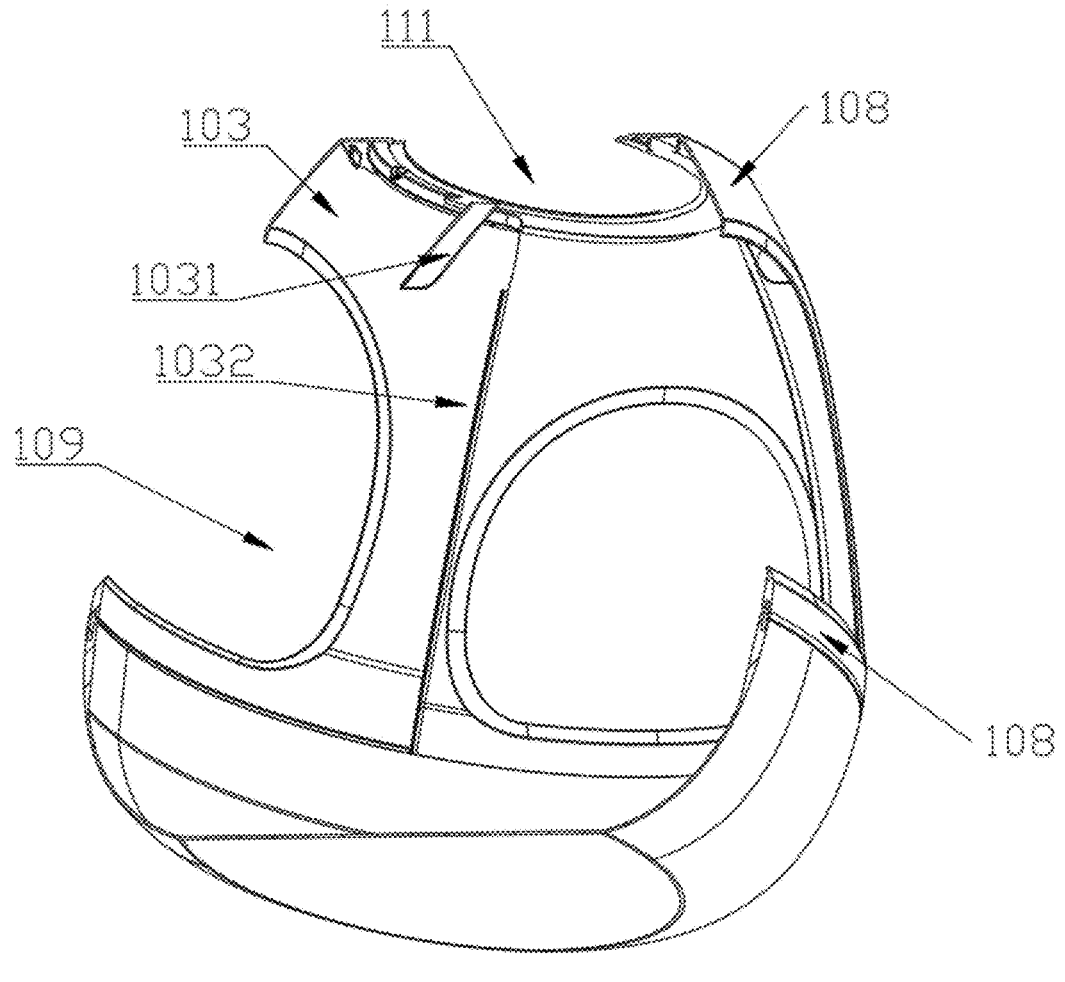
FIG. 5 is a cross-sectional stereoscopic view of a hidden inner member and a claw grinding member of the invention.
Figure 6:
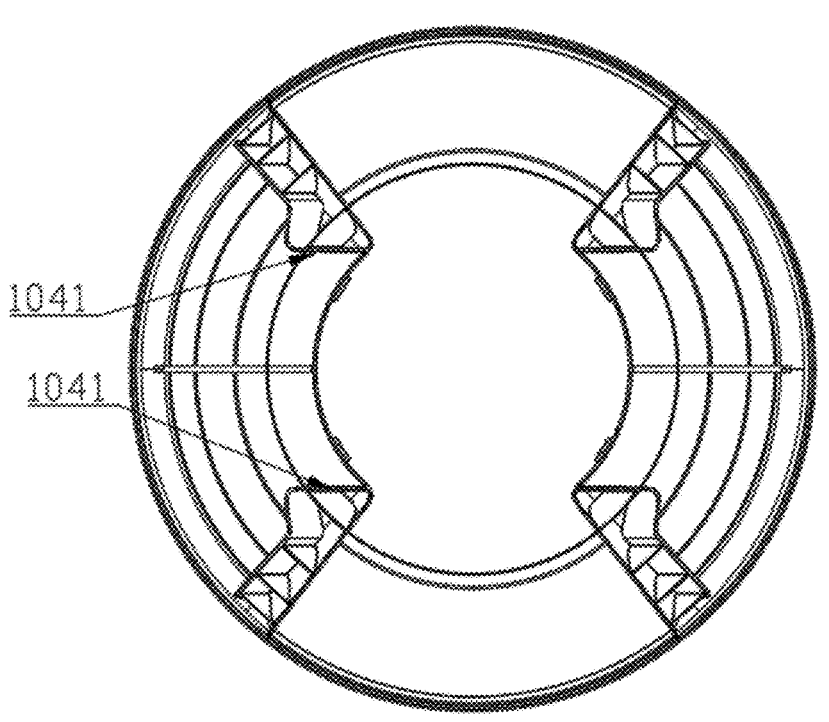
FIG. 6 is a top view of FIG. 4.
Figure 7:
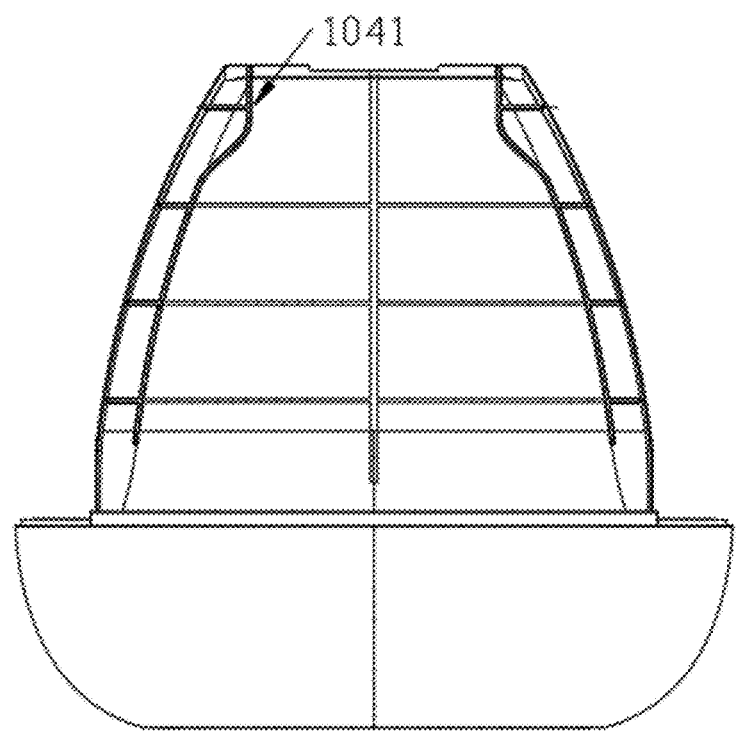
FIG. 7 is a side view of FIG. 4.
Figure 8:
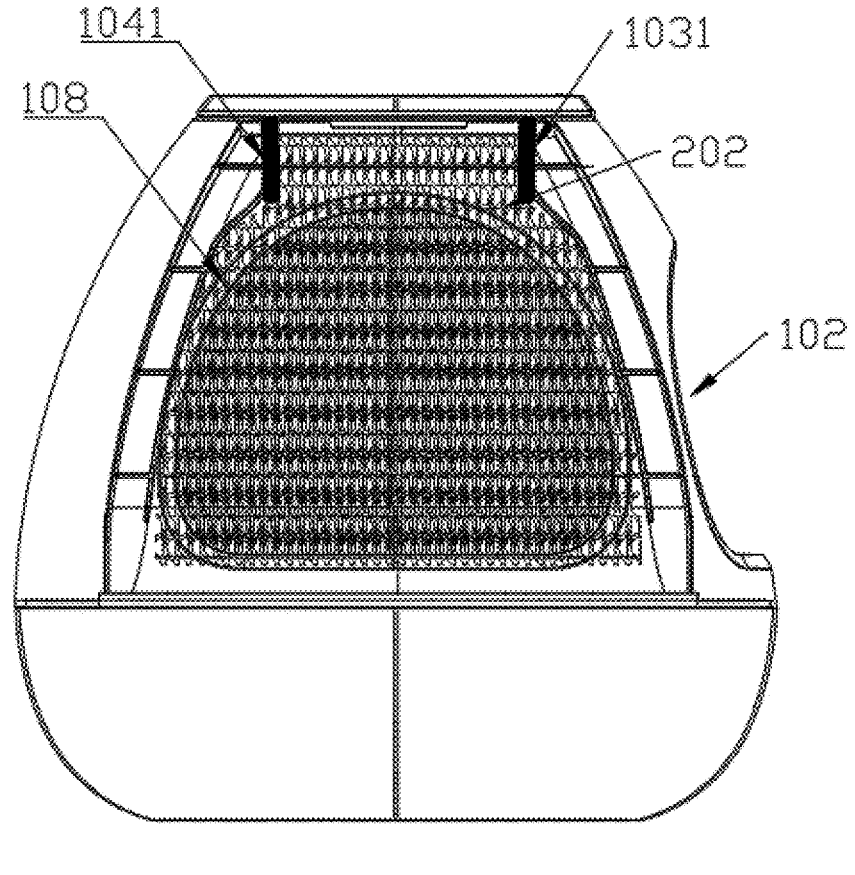
FIG. 8 is a perspective view of an inner member, an outer member, and a claw grinding member of the invention mating together.

REFERENCE NUMERALS 1 container; 101 placement area; 102 entrance; 103 outer member; 1031 second limiting rib; 1032 third limiting rib; 104 inner member; 1041 first limiting rib; 1042 first connecting portion; 1043 stiffening rib; 1044 second connecting portion; 105 base; 106 inward recess; 107 slot; 108 limiting wall; 109 perforation; 110 recessed structure; 1101 recessed outer cylinder; 1102 recessed inner cylinder; 1103 placement ring; 1104 vent hole; 1105 step; 111 mounting hole; 2 claw grinding member; 201 claw grinding portion; 202 insert; 301 first mounting insert; 302 first mounting slot; 303 second mounting insert, 304 second mounting slot; 305 third mounting insert; 306 third mounting slot; 307 snap-in block; 308 snap-in groove.

DESCRIPTION OF THE EMBODIMENTS

In order to make those skilled in the art better understand the invention and thereby define the scope of the invention more clearly, the invention is described below in detail with respect to some specific embodiments of the invention. It should be noted that the following description only relates to some specific embodiments of the inventive concept and are only part of the embodiments of the invention, specific and direct descriptions of relevant structures are merely for the convenience of understanding the invention, and the specific features do not, of course, directly limit the implementation scope of the invention.

With reference to the drawings, the invention adopts the following technical solution: a pet appliance, includes: a container 1, where the container 1 includes at least one placement area 101, and the placement area may be an area for rest or an area for placing cat litter; or the placement area provides other functions, such as placing toys, placing food, etc.; at least one entrance 102, where the entrance 102 is configured to enter and exit the placement area 101; and at least one claw grinding member 2 provided on the container 1, where at least part of a claw grinding portion 201 of the claw grinding member 2 is exposed on an outer wall of the container 1. The claw grinding portion 201 may also be exposed from the outer wall and an inner wall at the same time.

With the technical solution described above, the container 1 is a surrounding structure, so that odor generated by excretion of pets such as cats and dogs does not escape; the claw grinding portion 201 of the claw grinding member 2 of the invention is arranged on the outer wall of the container 1, and pets such as cats or dogs are outside the container to use the claw grinding member 2, thereby solving the technical problem that cat litter will be splashed out during scratching of the cat claw on the claw grinding member 2 when the container 1 is used as a cat litter box, the claw grinding member 2 is placed on the inner wall of the container 1, and the cat will use the claw grinding member in the cat litter box, that is, the front claw of the cat scratches on the claw grinding member 2, while the rear claw constantly rides on different positions of an area with litter. As the invention is mounted on the outer wall, so that the cat does not contact the litter when using the claw grinding member, thereby avoiding the technical problem described above. The claw grinding member 2 of the invention is detachably connected and can be replaced when the claw grinding portion 201 is severely worn.

Here, the detachable connection may also be realized by connecting to the outer wall of the container 1 through an adhesive structure such as double-sided tape, Velcro or the like.

Here, the container 1 is provided with at least one inward recess 106 for receiving the claw grinding member 2, and at least part of a side wall of the claw grinding member 2 is in contact and mates with an inner wall of the inward recess 106 for limiting. In this way, the shape of the claw grinding member 2 is adapted to the shape of the inward recess 106.

Here, at least one slot 107 is provided on a circumferential inner wall of the inward recess 106, a limiting wall 108 is formed between a bottom inner wall of the slot 107 and at least one side wall of the container 1, an insert 202 mating with the slot 107 is formed on an outer wall of the claw grinding member 2, and the insert 202 is at least partially inserted into the slot 107 for limiting. A plurality of slots 107 may be provided, the plurality of slots 107 are continuously arranged along an edge of the inward recess 106, and the plurality of slots 107 are communicated with each other to form an annular groove, while the limiting walls 108 at each slot 107 are interconnected to form a limiting ring. The at least one side wall of the container 1 described above may be the outer wall of the container 1. In this way, the claw grinding member 2 is slightly larger than the inward recess 106, and the insert 202 at the edge of the claw grinding member 2 is inserted into the annular groove and is limited by the limiting ring.

The container 1 includes at least one outer member 103 and at least one inner member 104, the inner member 104 and the outer member 103 are detachably connected, the outer member 103 is provided with a perforation 109, an outer wall of the inner member 104 at least partially forms a bottom inner wall of the inward recess 106, a spacing is present between the bottom inner wall of the inward recess 106 and an inner wall of the outer member 103, the inner wall of the outer member 103 on a peripheral side of the perforation 109 forms a limiting ring, at least part of an edge of the claw grinding member 2 is limited by the limiting ring, and part of the claw grinding member 2 is exposed from the perforation 109.

The inner member 104 and the outer member 103 are respectively provided with a first mounting insert 301 and a first mounting slot 302 which are plugged into each other. The inner member 104 and the outer member 103 are respectively provided with a third mounting insert 305 and a third mounting slot 306 which are plugged into each other, and the first mounting insert 301 and the third mounting insert 305 are respectively arranged on upper and lower sides of the inner member 104. An inner wall of the third mounting insert 305 is provided with a snap-in block 307, and an inner wall of the third mounting slot 306 is provided with a snap-in groove 308 mating with the snap-in block 307. The container 1 further includes a base 105, and the inner member 104 and the base 105 are respectively provided with a second mounting insert 303 and a second mounting slot 304 which are plugged into each other. The first mounting insert 301 and the second mounting insert 303 are located on a same plane; and a lower edge of an outer wall of the outer member 103 mates with an upper edge of an outer wall of the base 105 for support. A cross section of the container 1 is at least partially polygonal or curved.

For example, the first mounting slot 302 is arranged on the outer member 103, and the first mounting insert 301 is arranged on the inner member 104; and the third mounting insert 305 is arranged on the inner member 104, and the third mounting slot 306 is arranged on the outer member 103. The base 105 is provided with a second mounting slot 304, and the inner member 104 is provided with a second mounting insert 303.

Here, a connection between the inner member 104 and the outer member 103 and a connection between the inner member 104 and the base 105 are both arc-shaped or polygonal, and when the first mounting insert 301 is inserted into the first mounting slot 302, the third mounting insert 305 is inserted into the third mounting slot 306, and the second mounting insert 303 is inserted into the second mounting slot 304, the insertion and mounting stability of each mounting insert in respective mounting slot is improved.

In the present embodiment, the inner member 104 and the outer member 103 are snap-connected with or plugged into each other, and in other embodiments, the inner member and the outer member may also be connected by screws.

At least one first limiting rib 1041 is provided on the outer wall of the inner member 104, a side wall of the first limiting rib 1041 forms a side wall of the inward recess 106, second limiting ribs 1031 are provided on the inner wall of the outer member 103, and inner walls of the two second limiting ribs 1031 are respectively fitted to outer walls of the two first limiting ribs 1041 for abutment and limiting.

A plane on which the first limiting rib 1041 is located is parallel to and non-coplanar with a plane on which a symmetry axis of the inner member 104 is located. And/or a plane on which the first limiting rib 1041 is located is arranged obliquely with respect to a plane on which a generatrix of the inner member 104 is located.

There are two first limiting ribs 1041 which are arranged opposite to each other.

With the technical solution described above, the first limiting rib 1041 and the second limiting rib 1031 mate and snap-fit with each other, so that they have a certain deformation, so that they tightly fit together to achieve stable mounting of the inner member 104 and the outer member 103, and the detachable plug-in structure can facilitate removal of the outer member 103 and the inner member 104 and replacement of the claw grinding member 2, thereby achieving the detachable connection of the claw grinding member 2.

Both side end portions of the inner member 104 are bent and buckled toward the outer member 103 to form a first connecting portion 1042, and at least one stiffening rib 1043 is provided between the first limiting rib 1041 and the first connecting portion 1042; and an end portion of a bottom side of the inner member 104 is bent or buckled toward the outer member 103 to form a second connecting portion 1044. The arrangement of the first connecting portion 1042 and the second connecting portion 1044 enables a circular arc connection and provides a spacing between the inner member 104 and the outer member 103 to facilitate mounting of the claw grinding member 2. The inner wall of the outer member 103 is provided with a third limiting rib 1032 for mating with the first connecting portion 1042.

As a preferred embodiment of the above technical solution, the container 1 is provided at a top portion thereof with at least one mounting hole 111 downward, and further includes a recessed structure 110, and the recessed structure 110 is arranged at the mounting hole 111.

With the technical solution described above, the mounting hole 111 is step-shaped, the recessed structure 110 includes a recessed outer cylinder 1101 and a recessed inner cylinder 1102 connected with the recessed outer cylinder 1101, a placement ring 1103 is provided on the recessed structure 110, and both the placement ring 1103 and a bottom portion of the recessed outer cylinder 1101 are provided with a step 1105 mating with the step-shaped mounting hole 111.

The bottom portion of the recessed outer cylinder 1101 and a top portion of the placement ring 1103 of the recessed outer cylinder 1101 are provided with a plurality of vent holes 1104, and an anti-odor member can be placed between the recessed inner cylinder 1102 and the recessed outer cylinder 1101, the anti-odor member is generally activated carbon which adsorbs odor, and a placement position may also be formed at the recessed inner cylinder 1102.

The claw grinding member 2 may be corrugated paper or the like.

Here, the container 1 in the pet appliance of the invention can be used as a nest for pets such as cats and dogs, or as a cat litter box.

Compared with the prior art, the invention has the following advantages: the invention has a simple structure, and the whole container 1 is a surrounding structure and egg-shaped, which can prevent odor from escaping; the invention combines a scratch board structure to realize multiple functions of the pet appliance; and the claw grinding portion 201 can smooth out tips of claws of pets, and can effectively prevent claws of pets such as cats and dogs from causing damage to indoor furniture. Moreover, a frosted surface of the claw grinding portion 201 can be used for pets to grind the claw independently, thereby avoiding the problem that the pets do not cooperate with the claw grinding and reducing the difficulty of pet claw trimming.

What is claimed is:

1. A pet appliance, comprising:
   a container, the container comprising at least one placement area;
   at least one entrance, the at least one entrance being configured to enter and exit the placement area; and
   at least one claw grinding member provided on the container, at least part of a claw grinding portion of the claw grinding member being exposed on an outer wall of the container;
   wherein the container comprises at least one outer member and at least one inner member, and the inner member and the outer member are detachably connected;
   at least one first limiting rib is provided on an outer wall of the inner member, a side wall of the first limiting rib forms a side wall of an inward recess, and a second limiting rib is provided on an inner wall of the outer member;
   both side end portions of the inner member are bent and buckled toward the outer member to form a first connecting portion, and at least one stiffening rib is provided between the first limiting rib and the first connecting portion; and the inner wall of the outer member is provided with a third limiting rib for mating with the first connecting portion.

2. The pet appliance according to claim 1, wherein the container is provided with at least one inward recess for receiving the claw grinding member, and at least part of a side wall of the claw grinding member is in contact with and limited by an inner wall of the inward recess.

3. The pet appliance according to claim 2, wherein at least one slot is provided on a circumferential inner wall of the inward recess, a limiting wall is formed between a bottom inner wall of the slot and at least one side wall of the container, an insert is formed on an outer wall of the claw grinding member, and the insert is at least partially inserted into the slot for limiting.

4. The pet appliance according to claim 3, wherein a plurality of slots and a plurality of limiting walls are arranged, the plurality of slots are continuously arranged along an edge of the inward recess, and the plurality of slots are communicated with each other to form an annular groove, and the limiting walls at each slot are interconnected to form a limiting ring.

5. The pet appliance according to claim 1, wherein the outer member is provided with a perforation, an outer wall of the inner member at least partially forms a bottom inner wall of the inward recess, a spacing is present between the bottom inner wall of the inward recess and an inner wall of the outer member, the inner wall of the outer member on a peripheral side of the perforation forms a limiting ring, at least part of an edge of the claw grinding member is limited by the limiting ring, and part of the claw grinding member is exposed from the perforation.

6. The pet appliance according to claim 5, wherein the inner member and the outer member are respectively provided with a first mounting insert and a first mounting slot which are plugged into each other.

7. The pet appliance according to claim 6, wherein the inner member and the outer member are respectively provided with a third mounting insert and a third mounting slot which are plugged into each other, and the first mounting insert and the third mounting insert are respectively arranged on upper and lower sides of the inner member.

8. The pet appliance according to claim 7, wherein an inner wall of the third mounting insert is provided with a snap-in block, and an inner wall of the third mounting slot is provided with a snap-in groove mating with the snap-in block.

9. The pet appliance according to claim 6, wherein the container further comprises a base, and the inner member and the base are respectively provided with a second mounting insert and a second mounting slot which are plugged into each other.

10. The pet appliance according to claim 9, wherein the first mounting insert and the second mounting insert are located on a same plane; and a lower edge of an outer wall of the outer member mates with an upper edge of an outer wall of the base for support.

11. The pet appliance according to claim 1, wherein there are two first limiting ribs which are arranged opposite to each other.

12. The pet appliance according to claim 1, wherein a cross section of the container is at least partially polygonal or curved.

13. The pet appliance according to claim 1, wherein the container is provided at a top portion thereof with at least one mounting hole downward, and further comprises a recessed structure, and the recessed structure is arranged at the mounting hole.

\* \* \* \* \*